(12) United States Patent
Mahany et al.

(10) Patent No.: US 6,895,450 B2
(45) Date of Patent: May 17, 2005

(54) COMMUNICATION NETWORK HAVING A PLURALITY OF BRIDGING NODES WHICH TRANSMIT A BEACON TO TERMINAL NODES IN POWER SAVING STATE THAT IT HAS MESSAGES AWAITING DELIVERY

(75) Inventors: Ronald L. Mahany, Cedar Rapids, IA (US); Robert C. Meier, Cuyahoga Falls, OH (US); Ronald E. Luse, Marion, IA (US)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 10/123,873

(22) Filed: Apr. 16, 2002

(65) Prior Publication Data

US 2003/0051080 A1 Mar. 13, 2003

Related U.S. Application Data

(63) Continuation of application No. 09/060,287, filed on Apr. 14, 1998, now Pat. No. 6,374,311, which is a continuation of application No. 08/395,555, filed on Feb. 28, 1995, now Pat. No. 5,740,366, which is a continuation of application No. 08/255,848, filed on Jun. 8, 1994, now Pat. No. 5,394,436, which is a continuation of application No. 07/970,411, filed on Nov. 2, 1992, now abandoned, which is a continuation-in-part of application No. 07/968,990, filed on Oct. 30, 1992, now abandoned, which is a continuation-in-part of application No. PCT/US92/08610, filed on Oct. 1, 1992, and a continuation-in-part of application No. 07/769,425, filed on Oct. 1, 1991, now abandoned, said application No. 10/123, 873, is a continuation-in-part of application No. 09/318,668, filed on May 25, 1999, now abandoned, which is a continuation of application No. 08/545,108, filed on Oct. 19, 1995, now Pat. No. 5,940,771, which is a continuation of application No. 07/947,102, filed on Sep. 14, 1992, now abandoned, which is a continuation-in-part of application No. 07/907,927, filed on Jun. 30, 1992, now abandoned, which is a continuation-in-part of application No. 07/857,603, filed on Mar. 30, 1992, now abandoned, and a continuation-in-part of application No. PCT/US92/03982, filed on May 13, 1992, now abandoned, and a continuation-in-part of application No. 07/802,348, filed on Dec. 4, 1991, now abandoned, which is a continuation-in-part of application No. 07/790,946, filed on Nov. 12, 1991, now abandoned.

(51) Int. Cl.$^7$ .............................................. G06F 13/372
(52) U.S. Cl. .................... 710/18; 709/227; 709/304; 709/320; 709/321; 455/342; 455/517; 455/524; 375/132; 375/202; 375/220; 370/329; 370/351; 710/46; 713/323; 713/324
(58) Field of Search .................... 710/18, 46; 709/227, 709/304; 713/320, 321, 323, 324; 455/342, 524, 517, 343; 375/132, 202, 220; 370/329, 351

(56) References Cited

U.S. PATENT DOCUMENTS

| | | | |
|---|---|---|---|
| 4,449,248 | A | 5/1984 | Leslie et al. |
| 4,794,649 | A | 12/1988 | Fujiwara |
| 4,804,954 | A | 2/1989 | Macnak et al. |

(Continued)

OTHER PUBLICATIONS

Biba, *A Hybrid Wireless MAC Protocol Supporting Asynchonous and Synchronous MSDU Delivery Services*, IEEE P802.11/91–92.

(Continued)

*Primary Examiner*—Tammara Peyton
(74) *Attorney, Agent, or Firm*—McAndrews, Held & Malloy, Ltd.

(57) ABSTRACT

An apparatus and a method for routing data in a radio data communication system having one or more host computers, one or more intermediate base stations, and one or more RF terminals organizes the intermediate base stations into an optimal spanning-tree network to control the routing of data to and from the RF terminals and the host computer efficiently and dynamically. Communication between the host computer and the RF terminals is achieved by using the network of intermediate base stations to transmit the data.

29 Claims, 2 Drawing Sheets

Microfiche Appendix Included
(10 Microfiche, 602 Pages)

U.S. PATENT DOCUMENTS

| | | |
|---|---|---|
| 4,964,121 A | 10/1990 | Moore |
| 4,977,611 A | 12/1990 | Maru |
| 4,995,099 A | 2/1991 | Davis |
| 5,025,486 A | 6/1991 | Klughart |
| 5,029,183 A | 7/1991 | Tymes |
| 5,031,231 A | 7/1991 | Miyazaki |
| 5,055,659 A | 10/1991 | Hendrick |
| 5,081,402 A | 1/1992 | Koleda |
| 5,087,099 A | 2/1992 | Stolarczyk |
| 5,089,813 A | 2/1992 | DeLuca et al. |
| 5,103,461 A * | 4/1992 | Tymes .................. 375/141 |
| 5,119,502 A | 6/1992 | Kallin et al. |
| 5,121,408 A | 6/1992 | Cai et al. |
| 5,123,029 A | 6/1992 | Bantz et al. |
| 5,128,938 A | 7/1992 | Borras |
| 5,134,347 A | 7/1992 | Koleda |
| 5,150,361 A | 9/1992 | Wieczorek et al. |
| 5,152,006 A | 9/1992 | Klaus |
| 5,168,498 A | 12/1992 | Adams et al. |
| 5,175,870 A | 12/1992 | Mabey et al. |
| 5,230,084 A | 7/1993 | Nguyen |
| 5,239,466 A | 8/1993 | Morgan et al. |
| 5,241,542 A | 8/1993 | Natarajan et al. |
| 5,241,691 A | 8/1993 | Owen |
| 5,265,270 A | 11/1993 | Stengel et al. |
| 5,274,666 A | 12/1993 | Dowdell et al. |
| 5,276,680 A | 1/1994 | Messenger |
| 5,278,831 A | 1/1994 | Mabey et al. |
| 5,293,639 A | 3/1994 | Wilson et al. |
| 5,296,849 A | 3/1994 | Ide |
| 5,297,144 A | 3/1994 | Gilbert et al. |
| 5,361,397 A | 11/1994 | Wright |
| 5,373,506 A | 12/1994 | Tayloe et al. |
| 5,375,254 A | 12/1994 | Owen |
| 5,377,192 A | 12/1994 | Goodings et al. |
| 5,390,206 A | 2/1995 | Rein et al. |
| 5,392,023 A | 2/1995 | D'Avello et al. |
| 5,425,051 A * | 6/1995 | Mahany .................. 375/132 |
| 5,440,560 A | 8/1995 | Rypinski |
| 5,461,627 A | 10/1995 | Rypinski |
| 5,465,081 A | 11/1995 | Todd |
| 5,584,048 A | 12/1996 | Wieczorek |
| 5,828,695 A | 10/1998 | Webb |

OTHER PUBLICATIONS

Cheah, *A Proposed Architecture and Access Protocol Outline for the IEEE 802.11 Radio LAN Standards, Part II*, Document IEEE P802.11/91–54.

Cox, *A Radio System Proposal for Widespread Low–Power Tetherless Communications*, IEEE Transactions on Communications, vol. 39, No. 2 (Feb. 1991).

Natarajan et al., *Battery Efficient Operation of Radio MAC Protocol*, Document IEEE P802.11/91–102.

Rypinski, *Power–Drain Considerations for Full Time and Sleep Mode Radio Receivers*, Document IEEE P802.11/91–99.

Haine, *A New Radio Access Protocol and Network Architecture for Mobile Packet Data*, 41st IEEE Ventricular Technology Conference.

Owen, *The DECT Radio Interface*, Colloquium on CT2/CA1 and DECT Cordless Telecommunications (1990).

* cited by examiner

COMMUNICATION NETWORK HAVING A PLURALITY OF BRIDGING NODES WHICH TRANSMIT A BEACON TO TERMINAL NODES IN POWER SAVING STATE THAT IT HAS MESSAGES AWAITING DELIVERY

CROSS-REFERENCE TO RELATED APPLICATIONS

The present application is a continuation of application Ser. No. 09/060,287 filed Apr. 14, 1998, now U.S. Pat. No. 6,374,311 issued Apr. 16, 2002, which is a continuation of application Ser. No. 08/395,555 filed Feb. 28, 1995, now U.S. Pat. No. 5,740,366 issued Apr. 14, 1998, which is a continuation of application Ser. No. 08/255,848 filed Jun. 8, 1994, now U.S. Pat. No. 5,394,436 issued Feb. 28, 1995, which is a continuation of application Ser. No. 07/970,411 filed Nov. 2, 1992, now abandoned, which is a continuation-in-part of application Ser. No. 07/968,990 filed Oct. 30, 1992, now abandoned, which is a continuation-in-part of application Ser. No. 07/769,425 filed Oct. 1, 1991, now abandoned. Said application Ser. No. 07/968,990 is also a continuation-in-part of PCT international Application No. PCT/US92/08610 filed Oct. 1, 1992 and published as WO 93/07691 with a publication date of Apr. 15, 1993.

The entire disclosures of each of the above application Ser. Nos. 07/769,425, 07/968,990 and PCT/US92/08610, including the drawings and appendices are incorporated herein by reference as if set forth fully in this application.

The present application is a continuation in part of application Ser. No. 09/318,668 filed May 25, 1999, now abandoned, which is a continuation of application Ser. No. 08/545,108 filed Oct. 19, 1995, now U.S. Pat. No. 5,940,771 issued Aug. 17, 1999, which itself is a continuation of U.S. application Ser. No. 07/947,102 filed Sep. 14, 1992, now abandoned. Said application Ser. No. 07/947,102 is a continuation in part of U.S. application Ser. No. 07/907,927 filed Jun. 30, 1992, now abandoned, which is a continuation in part of: 1) U.S. application Ser. No. 07/857,603 filed Mar. 30, 1992, now abandoned; 2) PCT Application No. PCT/US92/03982 filed May 13, 1992, now abandoned; and 3) U.S. application Ser. No. 07/802,348 filed Dec. 4, 1991, now abandoned, which is itself a continuation in part of U.S. application Ser. No. 07/790,946 filed Nov. 12, 1991, now abandoned.

Appendix B is a microfiche appendix containing a list of the program modules (also included as Appendix A) and the program modules themselves which comprise an exemplary computer program listing of the source code used by the network controllers and intelligent base transceivers of the present invention. The microfiche appendix has ten (10) total microfiche sheets and six hundred two (602) total frames, and was originally filed in application Ser. No. 07/970,411 on Nov. 2, 1992, and is hereby incorporated herein in its entirety by reference to said application Ser. No. 07/970,411.

BACKGROUND OF THE INVENTION

In a typical radio data communication system having one or more host computers and multiple RF terminals, communication between a host computer and an RF terminal is provided by one or more base stations. Depending upon the application and the operating conditions, a large number of these base stations may be required to adequately serve the system. For example, a radio data communication system installed in a large factory may require dozens of base stations in order to cover the entire factory floor.

In earlier RF (Radio Frequency) data communication systems, the base stations were typically connected directly to a host computer through multi-dropped connections to an Ethernet communication line. To communicate between an RF terminal and a host computer, in such a system, the RF terminal sends data to a base station and the base station passes the data directly to the host computer. Communicating with a host computer through a base station in this manner is commonly known as hopping. These earlier RF data communication systems used a single-hop method of communication.

In order to cover a larger area with an RF data communication system and to take advantage of the deregulation of the spread-spectrum radio frequencies, later-developed RF data communication systems are organized into layers of base stations. As in earlier RF data communications systems, a typical system includes multiple base stations which communicate directly with the RF terminals and the host computer. In addition, the system also includes intermediate stations that communicate with the RF terminals, the multiple base stations, and other intermediate stations. In such a system, communication from an RF terminal to a host computer may be achieved, for example, by having the RF terminal send data to an intermediate station, the intermediate station send the data to a base station, and the base station send the data directly to the host computer. Communicating with a host computer through more than one station is commonly known as a multiple-hop communication system.

Difficulties often arise in maintaining the integrity of such multiple-hop RF data communication systems. The system must be able to handle both wireless and hard-wired station connections, efficient dynamic routing of data information, RF terminal mobility, and interference from many different sources.

SUMMARY OF THE INVENTION

The present invention solves many of the problems inherent in a multiple-hop data communication system. The present invention comprises an RF Local-Area Network capable of efficient and dynamic handling of data by routing communications between the RF Terminals and the host computer through a network of intermediate base stations.

In one embodiment of the present invention, the RF data communication system contains one or more host computers and multiple gateways, bridges, and RF terminals. Gateways are used to pass messages to and from a host computer and the RF Network. A host port is used to provide a link between the gateway and the host computer. In addition, gateways may include bridging functions and may pass information from one RF terminal to another. Bridges are intermediate relay nodes which repeat data messages. Bridges can repeat data to and from bridges, gateways and RF terminals and are used to extend the range of the gateways.

The RF terminals are attached logically to the host computer and use a network formed by a gateway and the bridges to communicate with the host computer. To set up the network, an optimal configuration for conducting network communication spanning tree is created to control the flow of data communication. To aid understanding by providing a more visual description, this configuration is referred to hereafter as a "spanning tree" or "optimal spanning tree".

Specifically, root of the spanning tree are the gateways; the branches are the bridges; and non-bridging stations, such as RF terminals, are the leaves of the tree. Data are sent along the branches of the newly created optimal spanning tree. Nodes in the network use a backward learning technique to route packets along the correct branches.

One object of the present invention is to route data efficiently, dynamically, and without looping. Another object of the present invention is to make the routing of the data transparent to the RF terminals. The RF terminals, transmitting data intended for the host computer, are unaffected by the means ultimately used by the RF Network to deliver their data.

It is a further object of the present invention for the network to be capable of handling RF terminal mobility and lost nodes with minimal impact on the entire RF data communication system.

DETAILED DESCRIPTION OF THE INVENTION

Figure 1:
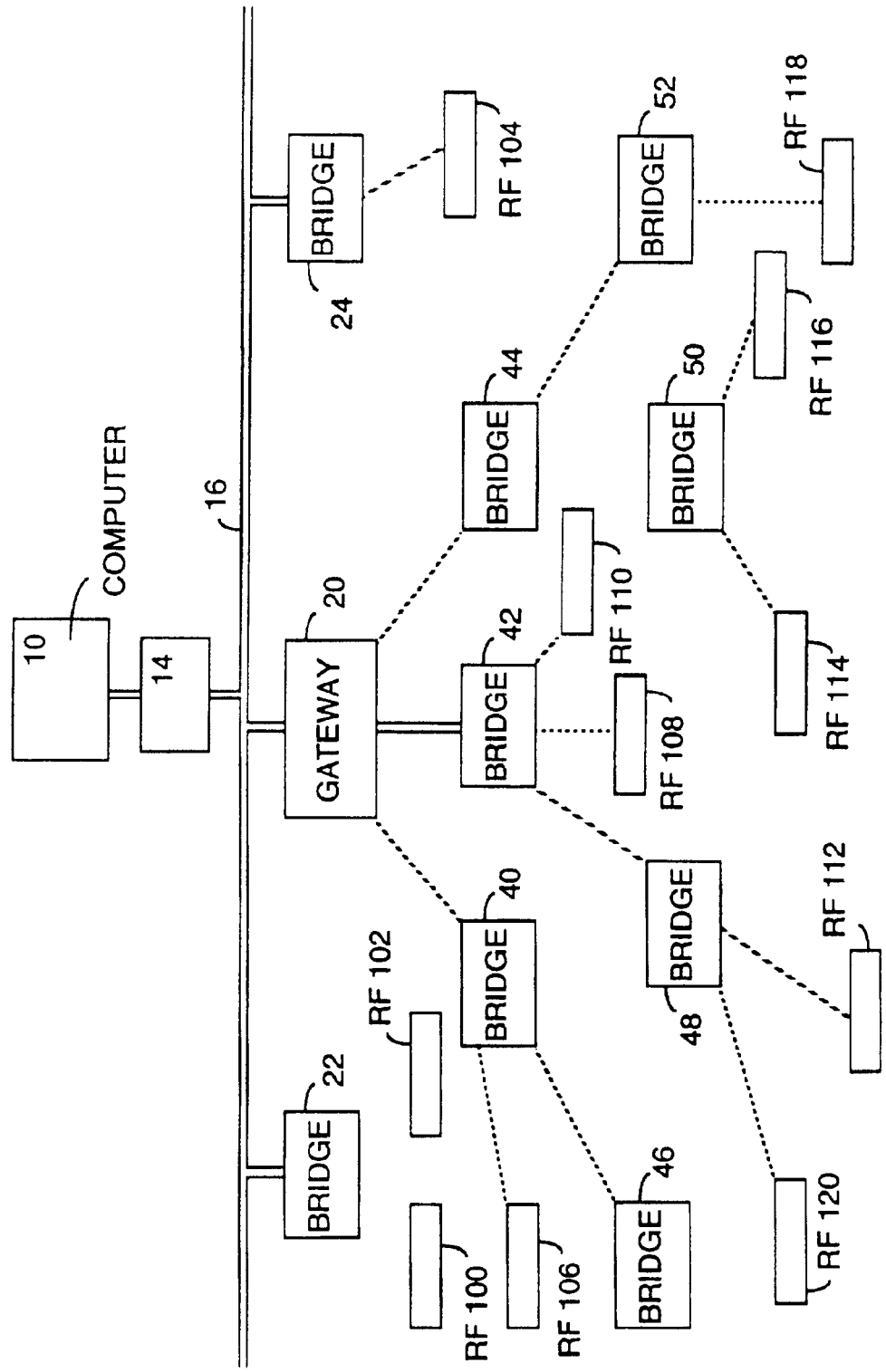
FIG. 1 is a functional block diagram of an RF data communication system incorporating the RF local-area network of the present invention.

FIG. 1 is a functional block diagram of an RF data communication system. In one embodiment of the present invention, the RF data communication system has a host computer 10, a network controller 14 and bridges 22 and 24 attached to a data communication link 16. Also attached to the data communication link 16 is a gateway 20 which acts as the root node for the spanning tree of the RF data network of the present invention. A bridge 42 is attached to the gateway 20 through a hard-wired communication link and bridges 40 and 44 are logically attached to gateway 20 by two independent RF links. Additional bridges 46, 48, 50 and 52 are also connected to the RF Network and are shown in the FIG. 1. Note that, although shown separate from the host computer 10, the gateway 20 (the spanning tree root node) may be part of host computer 10.

The FIG. 1 further shows RF terminals 100 and 102 attached to bridge 22 via RF links and RF terminal 104 attached to bridge 24 via an RF link. Also, RF terminals 106, 108, 110, 112, 114, 116, 118, and 120 can be seen logically attached to the RF Network through their respective RF links. The RF terminals in FIG. 1 are representative of non-bridging stations. In alternate embodiments of the present invention, the RF Network could contain any type of device capable of supporting the functions needed to communicate in the RF Network such as hard-wired terminals, remote printers, stationary bar code scanners, or the like. The RF data communication system, as shown in FIG. 1, represents the configuration of the system at a discrete moment in time after the initialization of the system. The RF links, as shown, are dynamic and subject to change. For example, changes in the structure of the RF data communication system can be caused by movement of the RF terminals and by interference that affects the RF communication links.

In the preferred embodiment, the host computer 10 is an IBM 3090, the network controller 14 is a model RC3250 of the Norand Corporation, the data communication link 16 is an Ethernet link, the nodes 20, 22, 24, 40, 42, 44, 46, 48, 50 and 52 are intelligent base transceiver units of the type RB4000 of the Norand Corporation, and the RF terminals 100, 102, 104, 106, 108, 110, 112, 114, 116, 118 and 120 are of type RT1100 of the Norand Corporation.

The optimal spanning tree, which provides the data pathways throughout the communication system, is stored and maintained by the network as a whole. Each node in the network stores and modifies information which specifies how local communication traffic should flow. Optimal spanning trees assure efficient, adaptive (dynamic) routing of information without looping.

To initialize the RF data communication system, the gateway 20 and the other nodes are organized into an optimal spanning tree rooted at the gateway 20. To form the optimal spanning tree, in the preferred embodiment the gateway 20 is assigned a status of ATTACHED and all other bridges are assigned the status UNATTACHED. The gateway 20 is considered attached to the spanning tree because it is the root node. Initially, all other bridges are unattached and lack a parent in the spanning tree. At this point, the attached gateway node 20 periodically broadcasts a specific type of polling packet referred to hereafter as "HELLO packets". The HELLO packets can be broadcast using known methods of communicating via radio frequency (RF) link or via a direct wire link. In the preferred embodiment of the present invention, the RF link is comprised of spread-spectrum transmissions using a polling protocol. Although a polling protocol is preferred, a carrier-sense multiple-access (CSMA), busy-tone, or any other protocol might also manage the communication traffic on the RF link.

HELLO packets contain 1) the address of the sender, 2) the hopping distance that the sender is from the root, 3) a source address, 4) a count of nodes in the subtree which flow through that bridge, and 5) a list of system parameters. Each node in the network is assigned a unique network service address and a node-type identifier to distinguish between different nodes and different node types. The distance of a node from the root node is measured in hops times the bandwidth of each hop. The gateway root is considered to be zero hops away from itself.

Figure 2:
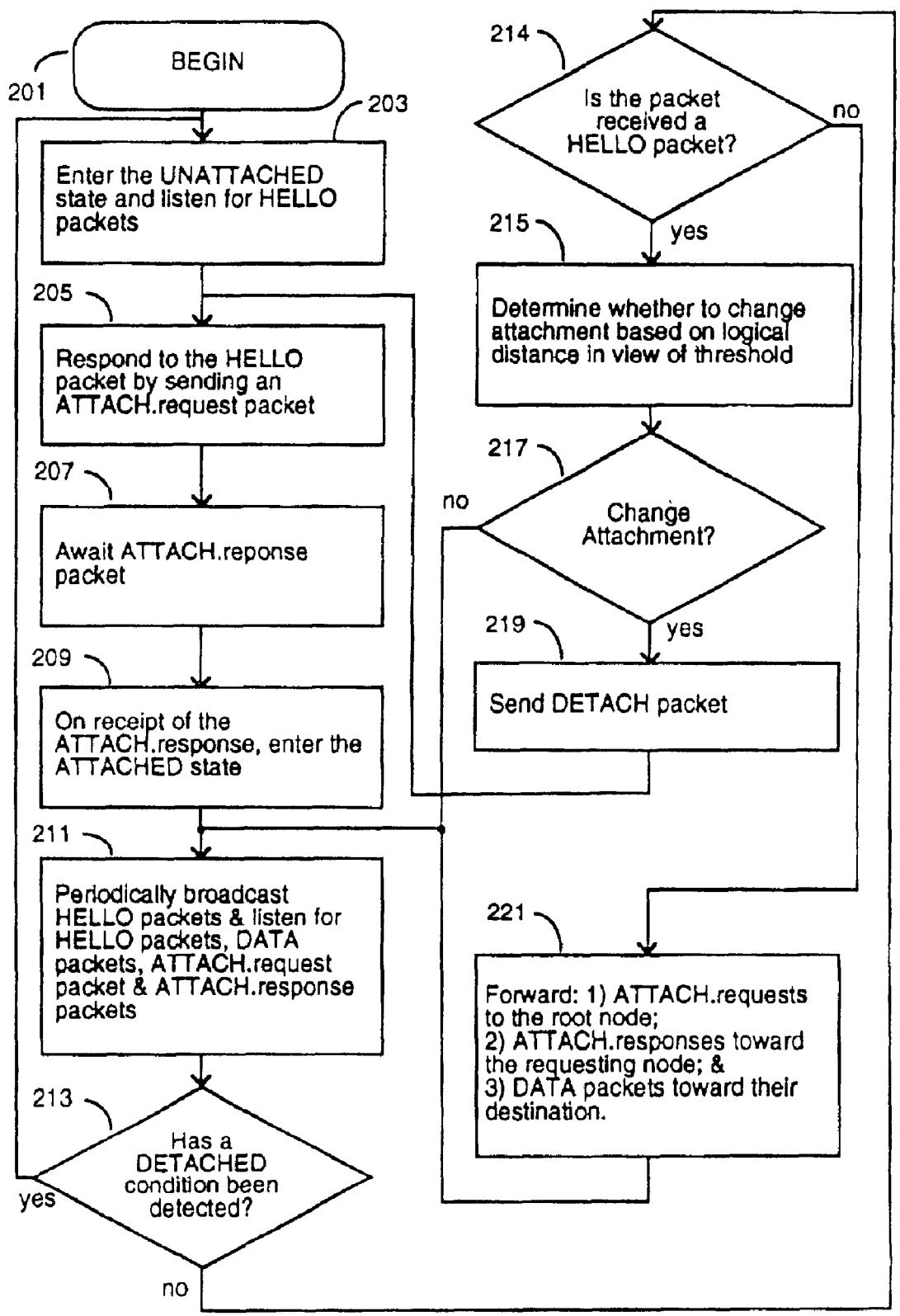
FIG. 2 is a flow diagram illustrating a bridging node's construction and maintenance of the spanning tree.

FIG. 2 is a flow diagram illustrating a bridge's participation in the construction and maintenance of the spanning tree. At a block 201, the bridge begins the local construction of the spanning tree upon power-up. Next, at a block 203, the bridge enters the UNATTACHED state, listening for HELLO packets (also referred to as HELLO messages herein) that are broadcast.

By listening to the HELLO messages, bridges can learn which nodes are attached to the spanning tree. At a block 205, the bridge responds to a HELLO packet received by sending an ATTACH.request packet to the device that sent the received HELLO packet. The ATTACH.request packet is thereafter forwarded towards and to the root node which responds by sending an ATTACH.response packet back down towards and to the bridge.

The bridge awaits the ATTACH.response packet at a block 207. Upon receipt of the ATTACH.response packet, at a block 209, the bridge enters an ATTACHED state. Thereafter, at a block 211, the bridge begins periodically broadcasting HELLO packets and begins forwarding or relaying packets received. Specifically, between HELLO packet broadcasts, the bridge listens for HELLO, DATA, ATTACH.request and ATTACH.response packets broadcast by other devices in the communication network. Upon receiving such a packet, the bridge branches to a block 213. At the block 213, if the bridge detects that it has become detached from the spanning tree the bridge will branch back to the block 203 to establish attachment. Note that although the illustration in FIG. 2 places block 213 immediately after the block 211, the bridges functionality illustrated in block 213 is actually distributed throughout the flow diagram.

If at the block 213 detachment has not occurred, at a block 214, the bridge determines if the received packet is a HELLO packet. If so, the bridge analyzes the contents of the HELLO packet at a block 215 to determine whether to change its attachment point in the spanning tree. In a preferred embodiment, the bridge attempts to maintain attachment to the spanning tree at the node that is logically closest to the root node.

The logical distance, in a preferred embodiment, is based upon the number of hops needed to reach the root node and the bandwidth of those hops. The distance the attached node is away from the root node is found in the second field of the HELLO message that is broadcast. In another embodiment of the present invention, the bridges consider the number of nodes attached to the attached node as well as the logical distance of the attached node from the root node. If an attached node is overloaded with other attached nodes, the unattached bridge may request attachment to the less loaded node, or to a more loaded node as described above in networks having regions of substantial RF overlap. In yet another embodiment, to avoid instability in the spanning tree, the bridge would only conclude to change attachment if the logical distance of the potential replacement is greater than a threshold value.

If no change in attachment is concluded, at a block 217 the bridge branches back to the block 211. If a determination is made to change attachment, a DETACH packet is sent to the root as illustrated at a block 219. After sending the DETACH packet, the bridge branches back to the block 205 to attach to the new spanning tree node. Note that the order of shown for detachment and attachment is only illustrative and can be reversed.

Referring back to the block 214, if the received packet (at block 211) is not a HELLO packet, the bridge branches to a block 221 to forward the received packet through the spanning tree. Afterwards, the bridge branches back to the block 211 to continue the process.

Specifically, once attached, the attached bridge begins broadcasting HELLO packets (at the block 211) seeking to have all unattached bridges (or other network devices) attach to the attached bridge. Upon receiving an ATTACH.request packet, the bridge forwards that packet toward the root node (through the blocks 211, 213, 214 and 221. On its path toward the root, each node records the necessary information of how to reach requesting bridge. This process is called "backward learning" herein, and is discussed more fully below. As a result of the backward learning, once the root node receives the ATTACH.request packet, an ATTACH.response packet can be sent through the spanning tree to the bridge requesting attachment.

After attaching to an attached node, the newly attached bridge (the child) must determine its distance from the root node. To arrive at the distance of the child from the root node, the child adds the broadcast distance of its parent from the root node to the distance of the child from its parent. In the preferred embodiment, the distance of a child from its parent is based on the bandwidth of the data communication link. For example, if the child attaches to its parent via a hard-wired link (data rate 26,000 baud), then the distance of that communication link might equal, for example, one hop. However, if the child attaches to its parent via an RF link (data rate 9600 baud), then the distance of that communication link might correspondingly be equal 3 hops. The number of the hop corresponds directly to the communication speed of the link. This may not only take into consideration baud rate, but also such factors as channel interference.

Initially, only the root gateway node 20 is broadcasting HELLO messages and only nodes 40, 42 and 44 are within range of the HELLO messages broadcast by the gateway. Therefore, after the listening period has expired, nodes 40, 42 and 44 request attachment to the gateway node 20. The unattached nodes 40, 42, and 44 send ATTACH.request packets and the attached gateway node 20 acknowledges the ATTACH.request packets with local ATTACH.confirm packets. The newly attached bridges are assigned the status ATTACHED and begin broadcasting their own HELLO packets, looking for other unattached bridges. Again, the remaining unattached nodes attempt to attach to the attached nodes that are logically closest to the root node. For example, node 48 is within range of HELLO messages from both nodes 40 and 42. However, node 40 is three hops, via an RF link, away from the gateway root node 20 and node 42 is only one hop, via a hard-wired link, away from the gateway root node 20. Therefore, node 48 attaches to node 42, the closest node to the gateway root node 20.

The sending of HELLO messages, ATTACH.request packets and ATTACH.confirm packets continues until the entire spanning tree is established. In addition, attached bridges may also respond to HELLO messages. If a HELLO message indicates that a much closer route to the root node is available, the attached bridge sends a DETACH packet to its old parent and an ATTACH.request packet to the closer node. To avoid instability in the system and to avoid overloading any given node, an attached bridge would only respond to a HELLO message if the hop count in a HELLO packet is greater than a certain threshold value, CHANGE_THRESHOLD. In the preferred embodiment, the value of the CHANGE_THRESHOLD equals 3. In this manner, an optimal spanning tree is formed that is capable of transmitting data without looping.

Nodes, other than the gateway root node, after acknowledging an ATTACH.request packet from a previously unattached node, will send the ATTACH.request packet up the branches of the spanning tree to the gateway root node. As the ATTACH.request packet is being sent to the gateway root node, other nodes attached on the same branch record the destination of the newly attached node in their routing entry table. When the ATTACH.request packet reaches the gateway root node, the gateway root node returns an end-to-end ATTACH.confirm packet.

After the spanning tree is initialized, the RF terminals listen for periodically broadcasted Hello packets to determine which attached nodes are in range. After receiving HELLO messages from attached nodes, an RF terminal responding to an appropriate poll sends an ATTACH.request packet to attach to the node logically closest to the root. For example, RF terminal 110 is physically closer to node 44. However, node 44 is three hops, via an RF link, away from the gateway root node 20 and node 42 is only one hop, via a hard-wired link, away from the gateway root node 20. Therefore, RF terminal 110, after hearing HELLO messages from both nodes 42 and 44, attaches to node 42, the closest node to the gateway root node 20. Similarly, RF terminal 114 hears HELLO messages from nodes 48 and 50. Nodes 48 and 50 are both four hops away from the gateway root node 20. However, node 48 has two RF terminals 110 and 112 already attached to it while node 50 has only one RF terminal 116 attached to it. Therefore, RF terminal 114 will attach to node 50, the least busy node of equal distance to the gateway root node 20. Attaching to the least busy node proves to be the most efficient practice when the communication system has little overlap in the RF communication regions. In another embodiment, however, instead of attaching to the least busy node of equal distance to the gateway root node 20, the attachment is established with the busiest node.

The attached node acknowledges the ATTACH.request and sends the ATTACH.request packet to the gateway root node. Then, the gateway root node returns an end-to-end ATTACH.confirm packet. In this manner, the end-to-end ATTACH.request functions as a discovery packet enabling the gateway root node, and all other nodes along the same branch, to learn the address of the RF terminal quickly. This process is called backward learning. Nodes learn the addresses of terminals by monitoring the traffic from terminals to the root. If a packet arrives from a terminal that is not contained in the routing table of the node, an entry is made in the routing table. The entry includes the terminal address and the address of the node that sent the packet. In addition, an entry timer is set for that terminal. The entry timer is used to determine when RF terminals are actively using the attached node. Nodes maintain entries only for terminals that are actively using the node for communication. If the entry timer expires due to lack of communication, the RF terminal entry is purged from the routing table.

The RF links among the RF terminals, the bridges, and the gateway are often lost. Therefore, a connection-oriented data-link service is used to maintain the logical node-to-node links. In the absence of network traffic, periodic messages are sent and received to ensure the stability of the RF link. As a result, the loss of a link is quickly detected and the RF Network can attempt to establish a new RF link before data transmission from the host computer to an RF terminal is adversely affected.

Communication between terminals and the host computer is accomplished by using the resulting RF Network. To communicate with the host computer, an RF terminal sends a data packet in response to a poll from the bridge closest to the host computer. Typically, the RF terminal is attached to the bridge closest to the host computer. However, RF terminals are constantly listening for HELLO and polling messages from other bridges and may attach to, and then communicate with, a bridge in the table of bridges that is closer to the particular RF terminal.

Under certain operating conditions, duplicate data packets can be transmitted in the RF Network. For example, it is possible for an RF terminal to transmit a data packet to its attached node, for the node to transmit the acknowledgement frame, and for the RF terminal not to receive the acknowledgement. Under such circumstances, the RF terminal will retransmit the data. If the duplicate data packet is updated into the database of the host computer, the database would become corrupt. Therefore, the RF Network of the present invention detects duplicate data packets. To ensure data integrity, each set of data transmissions receives a sequence number. The sequence numbers are continuously incremented, and duplicate sequence numbers are not accepted.

When a bridge receives a data packet from a terminal directed to the host computer, the bridge forwards the data packet to the parent node on the branch. The parent node then forwards the data packet to its parent node. The forwarding of the data packet continues until the gateway root node receives the data packet and sends it to the host computer. Similarly, when a packet arrives at a node from the host computer directed to an RF terminal, the node checks its routing entry table and forwards the data packet to its child node which is along the branch destined for the RF terminal. It is not necessary for the nodes along the branch containing the RF terminal to know the ultimate location of the RF terminal. The forwarding of the data packet continues until the data packet reaches the final node on the branch, which then forwards the data packet directly to the terminal itself.

Communication is also possible between RF terminals. To communicate with another RF terminal, the RF terminal sends a data packet to its attached bridge. When the bridge receives the data packet from a terminal directed to the host computer, the bridge checks to see if the destination address of the RF terminal is located within its routing table. If it is, the bridge simply sends the message to the intended RF terminal. If not, the bridge forwards the data packet to its parent node. The forwarding of the data packet up the branch continues until a common parent between the RF terminals is found. Then, the common parent (often the gateway node itself) sends the data packet to the intended RF terminal via the branches of the RF Network.

During the normal operation of the RF Network, RF terminals can become lost or unattached to their attached node. If an RF terminal becomes unattached, for whatever reason, its routing entry is purged and the RF terminal listens for HELLO or polling messages from any attached nodes in range. After receiving HELLO or polling messages from attached nodes, the RF terminal sends an ATTACH.request packet to the attached node closest to the root. That attached node acknowledges the ATTACH.request and sends the ATTACH.request packet onto the gateway root node. Then, the gateway root node returns an end-to-end ATTACH.confirm packet.

Bridges can also become lost or unattached during normal operations of the RF Network. If a bridge becomes lost or unattached, all routing entries containing the bridge are purged. The bridge then broadcasts a HELLO.request with a global bridge destination address. Attached nodes will broadcast HELLO packets immediately if they receive an ATTACH.request packet with a global destination address. This helps the lost node re-attach. Then, the bridge enters the LISTEN state to learn which attached nodes are within range. The unattached bridge analyzes the contents of broadcast HELLO messages to determine whether to request attachment to the broadcasting node. Again, the bridge attempts to attach to the node that is logically closest to the root node. After attaching to the closest node, the bridge begins broadcasting HELLO messages to solicit ATTACH.requests from other nodes or RF terminals.

The spread-spectrum system provides a hierarchical radio frequency network of on-line terminals for data entry and message transfer in a mobile environment. The network is characterized by sporadic data traffic over multiple-hop data paths consisting of RS485 or ethernet wired links and single-channel direct sequenced spread spectrum links. The network architecture is complicated by moving, hidden, and sleeping nodes. The spread spectrum system consists of the following types of devices:

Terminal controller—A gateway which passes messages from a host port to the RF network; and which passes messages from the network to the host port. The host port (directly or indirectly) provides a link between the controller and a "host" computer to which the terminals are logically attached.

Base station—An intermediate relay node which is used to extend the range of the controller node. Base station-to-controller or base station-to-base station links can be wired or wireless RF.

Terminal—Norand RF hand-held terminals, printers, etc. In addition, a controller device has a terminal component.

The devices are logically organized as nodes in an (optimal) spanning tree, with the controller at the root, internal nodes in base stations or controllers on branches of the tree, and terminal nodes as (possibly mobile) leaves on the tree. Like a sink tree, nodes closer to the root of the spanning tree are said to be "downstream" from nodes which are further away. Conversely, all nodes are "upstream" from the root. Packets are only sent along branches of the spanning tree. Nodes in the network use a "BACKWARD LEARNING" technique to route packets along the branches of the spanning tree.

Devices in the spanning tree are logically categorized as one of the following three node types:

1) Root (or root bridge)—A controller device which functions as the root bridge of the network spanning tree. In the preferred embodiment, the spanning tree has a single root node. Initially, all controllers are root candidates from which a root node is selected. This selection may be based on the hopping distance to the host, preset priority, random selection, etc.

2) Bridge—An internal node in the spanning tree which is used to "bridge" terminal nodes together into an interconnected network. The root node is also considered a bridge and the term "bridge" may be used to refer to all non-terminal nodes or all non-terminal nodes except the root, depending on the context herein. A bridge node consists of a network interface function and a routing function.

3) Terminal—leaf node in the spanning tree. A terminal node can be viewed as the software entity that terminates a branch in the spanning tree.

A controller device contains a terminal node(s) and a bridge node. The bridge node is the root node if the controller is functioning as the root bridge. A base station contains a bridge node. A terminal device contains a terminal node and must have a network interface function. A "bridging entity" refers to a bridge node or to the network interface function in a terminal.

The basic requirements of the system are the following.
a) Wired or wireless node connections.
b) Network layer transparency.
c) Dynamic/automatic network routing configuration.
d) Terminal mobility. Terminals should be able to move about the RF network without losing an end-to-end connection.
e) Ability to accommodate sleeping terminals.
f) Ability to locate terminals quickly.
g) Built-in redundancy. Lost nodes should have minimal impact on the network.
h) Physical link independence. The bridging algorithm is consistent across heterogeneous physical links.

The software for the spread-spectrum system is functionally layered as follows.

Medium Access Control (MAC)

The MAC layer is responsible for providing reliable transmission between any two nodes in the network (i.e. terminal-to-bridge). The MAC has a channel access control component and a link control component. The link control component facilitates and regulates point-to-point frame transfers in the absence of collision detection. The MAC channel access control component regulates access to the network. Note that herein, the MAC layer is also referred to as the Data Link layer.

Bridging Layer

The bridging layer, which is also referred to herein as the network layer, has several functions as follows.

1. The bridging layer uses a "HELLO protocol" to organize nodes in the network into an optimal spanning tree rooted at the root bridge. The spanning tree is used to prevent loops in the topology. Interior branches of the spanning tree are relatively stable (i.e. controller and relay stations do not move often). Terminals, which are leaves on the spanning three, may become unattached, and must be reattached, frequently.

2. The bridging layer routes packets from terminals to the host, from the host to terminals, and from terminals to terminals along branches of the spanning tree.

3. The bridging layer provides a service for storing packets for SLEEPING terminals. Packets which cannot be delivered immediately can be saved by the bridging entity in a parent node for one or more HELLO times.

4. The bridging layer propagates lost node information throughout the spanning tree.

5. The bridging layer maintains the spanning tree links.

6. The bridging layer distributes network interface addresses.

Logical Link Control Layer

A logical link control layer, also known herein as the Transport layer herein, is responsible for providing reliable transmission between any two nodes in the network (i.e., terminal-to-base station). The data-link layer provides a connection-oriented reliable service and a connectionless unreliable service. The reliable service detects and discards duplicate packets and retransmits lost packets. The unreliable services provides a datagram facility for upper layer protocols which provide a reliable end-to-end data path. The data-link layer provides ISO layer 2 services for terminal-to-host application sessions which run on top of an end-to-end terminal-to-host transport protocol. However, the data-link layer provides transport (ISO layer 4) services for sessions contained within the SST network.

Higher Layers

For terminal-to-terminal sessions contained within the SST network, the data-link layer provides transport layer services and no additional network or transport layer is required. In this case, the MAC, bridging, and data-link layers discussed above can be viewed as a data-link layer, a network layer, and a transport layer, respectively. For terminal-to-host-application sessions, higher ISO layers exist on top of the SST data-link layer and must be implemented in the terminal and host computer, as required. This document does not define (or restrict) those layers. This document does discuss a fast-connect VMTP-like transport protocol which is used for transient internal terminal-to-terminal sessions.

Specifically, a network layer has several functions, as follows.

1) The network layer uses a "hello protocol" to organize nodes in the network into an optimal spanning tree rooted at the controller. (A spanning tree is required to prevent loops in the topology.) Interior branches of the spanning tree are relatively stable (i.e., the controller and base stations do not move often). Terminals, which are leaves on the spanning tree, become unattached, and must be reattached frequently.

2) The network layer routes messages from terminals to the host, from the host to terminals, and from terminals to terminals along branches of the spanning tree.

3) The network layer provides a service for storing messages for SLEEPING terminals. Messages which cannot be delivered immediately can be saved by the network entity in a parent node for one or more hello times.

4) The network layer propagates lost node information throughout the spanning tree.

5) The network layer maintains the spanning tree links in the absence of regular data traffic.

A transport layer is responsible for establishing and maintaining a reliable end-to-end data path between transport access points in any two nodes in the network. The transport layer provides unreliable, reliable and a transaction-oriented services. The transport layer should be immune to implementation changes in the network layer.

The responsibilities of the transport layer include the following.

1) Establishing and maintaining TCP-like connections for reliable root-to-terminal data transmission.

2) Maintaining VMTP-like transaction records for reliable transient message passing between any two nodes.

3) Detecting and discarding duplicate packets.

4) Retransmitting lost packets.

Layers 1 through 4 are self-contained within the Norand RF network, and are independent of the host computer and of terminal applications. The session layer (and any higher layers) are dependent on specific applications. Therefore, the session protocol (and higher protocols) must be implemented as required. Note that a single transport access point is sufficient to handle single sessions with multiple nodes. Multiple concurrent sessions between any two nodes could be handled with a session identifier in a session header.

Network address requirements are as follows. DLC framed contain a hop destination and source address in the DLC header. Network packets contain an end-to-end destination and a source address in the network header. Transport messages do not contain an address field; instead, a transport connection is defined by network layer source and destination address pairs. Multiple transport connections require multiple network address pairs.

The transport header contains a TRANSPORT ACCESS POINT identifier. DLC and network addresses are consistent and have the same format. Each node has a unique LONG ADDRESS which is programmed into the node at the factory. The long address is used only to obtain a SHORT ADDRESS from the root node.

The network entity in each node obtains a SHORT ADDRESS from the root node, which identifies the node uniquely. The network entity passes the short address to the DLC entity. Short addresses are used to minimize packet sizes.

Short addresses consist of the following. There is: an address length bit (short or long).

a spanning tree identified.

a node-type identifier. Node types are well known.

a unique multi-cast or broadcast node identifier.

The node-identifier parts of root addresses are well known and are constant. A default spanning tree identifier is well known by all nodes. A non-default spanning tree identifier can be entered into the root node (i.e., by a network administrator) and advertised to all other nodes in "hello" packets. The list of non-default spanning trees to which other nodes can attach must be entered into each node.

A node-type identifier of all 1's is used to specify all node types. A node identifier of all 1's is used to specify all nodes of the specified type. A DLC identifier of all 0's is used to specify a DLC entity which does not yet have an address. The all-0's address is used in DLC frames that are used to send and receive network ADDRESS packets. (The network entity in each node filters ADDRESS packets based on the network address.)

Short-address allocation is accomplished as follows. Short node identifiers of root nodes are well known. All other nodes must obtain a short node identifier from the root. To obtain a short address, a node send an ADDRESS request packet to the root node. The source addresses (i.e., DLC and network) in the request packet are LONG ADDRESSES. The root maintains an address queue of used and unused SHORT ADDRESSES. If possible, the root selects an available short address, associates the short address with the long address of the requesting node, and returns the short address to the requesting node in an ADDRESS acknowledge packet. (Note that the destination address in the acknowledge packet is a long address.)

A node must obtain a (new) short address initially and whenever an ADDRESS-TIMEOUT inactivity period expires without having the node receive a packet from the network entity in the root.

The network entity in the root maintains addresses in the address queue in least recently used order. Whenever a packet is received, the source address is moved to the end of the queue. The address at the head of the queue is available for use by a requesting node if it has never been used or if it has been inactive for a MAX-ADDRESS-LIFE time period.

MAX-ADDRESS-LIFE must be larger than ADDRESS-TIMEOUT to ensure that an address is not in use by any node when it becomes available for another node. If the root receives an ADDRESS request from a source for which an entry exists in the address queue, the root simply updates the queue and returns the old address.

The network layer organizes nodes into an optimal spanning tree with the controller at the root of the tree. (Note that the spanning three identifier allows two logical trees to exist in the same coverage area.) Spanning tree organization is facilitated with a HELLO protocol which allows nodes to determine the shortest path to the root before attaching to the spanning tree. All messages are routed along branches of the spanning tree.

Nodes in the network are generally categorized as ATTACHED or UNATTACHED. Initially, only the root node is attached. A single controller may be designated as the root, or multiple root candidates (i.e. controllers) may negotiate to determine which node is the root. Attached bridge nodes and root candidates transmit "HELLO" packets at calculated intervals. The HELLO packets include:

a) the source address, which includes the spanning tree ID).

b) a broadcast destination address.

c) a "seed" value from which the time schedule of future hello messages can be calculated.

d) a hello slot displacement time specifying an actual variation that will occur in the scheduled arrival of the very next hello message (the scheduled arrival being calculated from the "seed").

e) the distance (i.e., path cost) of the transmitter from the host. The incremental portion of the distance between a node and its parent is primarily a function of the type of physical link (i.e., ethernet, RS485, RF, or the like). If a signal-strength indicator is available, connections are biased toward the link with the best signal strength. The distance component is intended to bias path selection toward (i.e., wired) high-speed connections. Setting a minimum signal strength threshold helps prevent sporadic changes in the network. In addition, connections can be biased to balance the load (i.e., the number of children) on a parent node.

f) a pending message list. Pending message lists consist of 0 or more destination-address/message-length pairs. Pending messages for terminals are stored in the terminal's parent node.

g) a detached-node list. Detached-node lists contain the addresses of nodes which have detached from the spanning tree. The root maintains two lists. A private list consists of all detached node addresses, and an advertised list consists of the addresses of all detached nodes which have pending transport messages. The addresses in the hello packet are equivalent to the advertised list.

An internal node learns which entries should be in its list from hello messages transmitted by its parent node. The root node builds its detached-node lists from information received in DETACH packets. Entries are included in hello messages for DETACH-MSG-LIFE hello times.

Attached notes broadcast "SHORT HELLO" messages immediately if they receive an "HELLO.request" packet with a global destination address; otherwise, attached nodes will only broadcast hello messages at calculated time intervals in "hello slots." Short hello messages do not contain a pending-message or detached-node list. Short hello messages are sent independently of regular hello messages and do not affect regular hello timing.

Unattached nodes (nodes without a parent in the spanning tree) are, initially, in an "UNATTACHED LISTEN" state. During the listen state, a node learns which attached base station/controller is closest to the root node by listening to hello messages. After the listening period expires an unattached node sends an ATTACH.request packet to the attached node closest to the root. The attached node immediately acknowledges the ATTACH.request, and send the ATTACH.request packet onto the root (controller) node. The root node returns the request as an end-to-end ATTACH-.confirm packet. If the newly-attached node is a base station, the node calculates its link distance and adds the distance to the distance of its parent before beginning to transmit hello messages.

The end-to-end ATTACH.request functions as a discovery packet, and enables the root node to learn the address of the source node quickly. The end-to-end ATTACH.request, when sent from a node to the root, does not always travel the entire distance. When a downstream node receives an ATTACH.request packet and already has a correct routing entry for the associated node, the downstream node intercepts the request and returns the ATTACH.confirm to the source node. (Note that any data piggy-backed on the ATTACH.request packet must still be forwarded to the host.) This situation occurs whenever a "new" path has more than one node in common with the "old" path.

The LISTEN state ends after MIN_HELLO hello time slots if hello messages have been received from at least one node. If no hello messages have been received the listening node waits and retries later.

An attached node may respond to a hello message from a node other than its parent (i.e., with an ATTACH.request) if the difference in the hop count specified in the hello packet exceeds a CHANGE-THRESHOLD level.

Unattached nodes may broadcast a GLOBAL ATTACH-.request with a multi-cast base station destination address to solicit short hello messages from attached base stations. The net effect is that the LISTEN state may (optionally) be shortened. (Note that only attached base station or the controller may respond to ATTACH.requests.) Normally, this facility is reserved for base stations with children and terminals with transactions in progress.

ATTACH.requests contain a (possibly empty) CHILD LIST, to enable internal nodes to update their routing tables. ATTACH.requests also contain a "count" field which indicates that a terminal may be SLEEPING. The network entity in the parent of a SLEEPING terminal con temporarily store messages for later delivery. If the count field is non-zero, the network entity in a parent node will store pending messages until 1) the message is delivered, or 2) "count" hello times have expired.

Transport layer data can be piggy-backed on an attached request packet from a terminal. (i.e., an attach request/confirm can be implemented with a bit flag in the network header of a data packet.)

Network Layer Routing.

All messages are routed along branches of the spanning tree. Base stations "learn" the address of terminals by monitoring traffic from terminals (i.e., to the root). When a base station receives (i.e., an ATTACH.request) packet, destined for the root, the base station creates or updates an entry in its routing table for the terminal. The entry includes the terminal address, and the address of the base station which sent the packet (i.e., the hop address). When a base station receives an upstream packet (i.e., from the root, destined for a terminal) the packet is simply forwarded to the base station which is in the routing entry for the destination. Upstream messages (i.e., to a terminal) are discarded whenever a routing entry does not exist. Downstream messages (i.e., from a terminal to the root) are simply forwarded to the next downstream node (i.e., the parent in the branch of the spanning tree.

TERMINAL-TO-TERMINAL COMMUNICATIONS is accomplished by routing all terminal-to-terminal traffic through the nearest common ancestor. In the worst case, the root is the nearest common ancestor. A "ADDRESS SERVER" facilitates terminal-to-terminal communications (see below).

DELETING INVALID ROUTING TABLE ENTRIES is accomplished in several ways: connection oriented transport layer ensures that packets will arrive from nodes attached to the branch of the spanning tree within the timeout period, unless a node is disconnected.)

2) Whenever the DLC entity in a parent fails RETRY MAX times to send a message to a child node, the node is logically disconnected from the spanning tree, with one exception. If the child is a SLEEPING terminal, the message is retained by the network entity in the parent for "count" hello times. The parent immediately attempts to deliver the message after it sends its next hello packet. If, after "count" hello times, the message cannot be delivered, then the child is logically detached from the spanning tree. Detached node information is propagated downstream to the root node, each node in the path of the DETACH packet must adjust its routing tables appropriately according to the following rules: a) if the lost node is a child terminal node, the routing entry for the terminal is deleted and a DETACH packet is generated, b) if the node specified in DETACH packet is a terminal and the node which delivered the packet is the next hop in the path to the terminal, then the routing table entry for the terminal is deleted and the DETACH packet is forwarded, c) if the lost node is a child base station node then all routing entries which specify that base station as the next hop are deleted and a DETACH packet is generated for each lost terminal.

IN GENERAL, WHENEVER A NODE DISCOVERS THAT A TERMINAL IS DETACHED, IT PURGES ITS ROUTING ENTRY FOR THE TERMINAL. WHENEVER A NODE DISCOVERS THAT A BASE STATION IS DETACHED, IT PURGES ALL ROUTING ENTRIES CONTAINING THE BASE STATION. ONLY ENTRIES FOR UPSTREAM NODES ARE DELETED.

When DETACH packets reach the root node, they are added to a "detached list." Nodes remain in the root node's detached list until a) the node reattaches to the spanning tree, or b) the list entry times out. The detached list is included in hello messages and is propagated throughout the spanning tree.

For example, if a terminal detaches and reattaches to a different branch in the spanning tree, all downstream nodes in the new branch (quickly) "learn" the new path to the terminal. Nodes which were also in the old path change their routing tables and no longer forward packets along the old path. At least one node, the root, must be in both the old and new path. A new path is established as soon as an end-to-end attach request packet from the terminal reaches a node which was also in the old path.

4) A node (quickly) learns that it is detached whenever it receives a hello message, from any node, with its address in the associated detached list. The detached node can, optionally, send a global ATTACH.request, and then enters the UNATTACHED LISTEN state and reattaches as described above. After reattaching, the node must remain in a HOLD-DOWN state until its address is aged out of all detached lists. During the HOLD-DOWN state the node ignores detached lists.

5) A node becomes disconnected and enters the UNATTACHED LISTEN state whenever HELLO-RETRY-MAX hello messages are missed from its parent node.

6) A node enters the ATTACHED LISTEN state whenever a single hello message, from its parent, is missed. SLEEPING terminals remain awake during the ATTACHED LISTEN state. The state ends when the terminal receives a data or hello message from its parent. The terminal becomes UNATTACHED when a) its address appears in the detached list of a hello message from an ode other than its parent, or b) HELLO-RETRY-MAX hello messages are missed. The total number of hello slots spend in the LISTEN state is constant.

If a node in the ATTACHED LISTEN state discovers a path to the root which is CHANGE-THRESHOLD shorter, it can attach to the shorter path. Periodically, SLEEPING terminals must enter the ATTACHED LEARN state to discovery any changes (i.e., shorter paths) in the network topology.

Hello Synchronization.

All attached non-terminal nodes broadcast periodic "hello" messages in discrete "hello slots" at calculated intervals. Base station nodes learn which hello slots are busy and refrain from transmitting during busy hello slots.

A terminal refrains from transmitting during the hello slot of its parent node and refrains from transmitting during message slots reserved in a hello message.

The hello message contains a "seed" field used in a well-known randomization algorithm to determine the next hello slot for the transmitting node and the next seed. The address of the transmitting node is used as a factor in the algorithm to guarantee randomization. Nodes can execute the algorithm i times to determine the time (and seed) if the i-the hello message from the transmitter.

After attached, a base station chooses a random initial seed and a non-busy hello slot and broadcasts a hello message in that slot. The base station chooses succeeding hello slots by executing the randomization algorithm. If an execution of the algorithm chooses a busy slot, the next free slot is used and a hello "displacement" field indicates the offset from a calculated slot. Cumulative delays are not allowed (i.e., contention delays during the i hello transmission do not effect the time of the i+1 hello transmission).

HELLO-TIME and HELLO-SLOT-TIME values are set by the root node and flooded throughout the network in hello messages. The HELLO-SLOT-TIME value must be large enough to minimize hello contention.

A node initially synchronizes on a hello message from its parent. A SLEEPING node can power-down with an active timer interrupt to wake it just before the next expected hello message. The network entity in base station nodes can store messages for SLEEPING nodes and transmit them immediately following the hello messages. This implementation enables SLEEPING terminals to receive unsolicited messages. (Note that the network layer always tries to deliver messages immediately, before storing them.) Retries for pending messages are transmitted in a round-robin order when messages are pending for more than one destination.

Note that a child node that misses i hello messages, can calculate the time of the i+1 hello message.

Transport Layer Theory and Implementation Notes.

The transport layer provides reliable, unreliable, and transaction-oriented services. Two types of transport connections are defined: 1) a TCP-like transport connection may be explicitly requested for long-lived connections or 2) a VMTP-like connection-record may be implicitly set up for transient connections. In addition, a connectionless service is provided for nodes which support an end-to-end transport connection with the host computer.

The interfaces to the next upper (i.e., application) layer include:

CONNECT (access_point, node_name)
LISTEN (access_point)
UNITDATA (access_point, node_name, buffer, length)
SEND (handle, buffer, length)
RECEIVE (handle, buffer, length)
CLOSE (handle)

The "handle" designates the connection type, and is the connection identifier for TCP-like connections.

SEND messages require a response from the network node (root or terminal) to which the message is directed.

UNITDATA messages do not require a response. UNITDATA is used to send messages to a host which is capable of supporting end-to-end host-to-terminal transport connections.

Because the network layer provides an unreliable service, the transport layer is required to detect duplicate packets and retransmit lost packets. Detecting duplicates is facilitated by numbering transport packets with unambiguous sequence numbers.

Transport Connections.

TCP-like transport connections are used for message transmission over long-lived connections. The connections may be terminal-to-root or terminal-to-terminal (i.e., base stations are not involved in the transport connection).

TCP-like transport connections are established using a 3-way handshake. Each end selects its initial sequence number and acknowledges the other end's initial sequence number during the handshake. The node which initiates the connection must wait a MAX-PACKET-LIFE time, before requesting a connection, to guarantee that initial sequence numbers are unambiguous. Sequence numbers are incremented modulo MAX-SEQ, where MAX-SEQ is large enough to insure that duplicate sequence numbers do not exist in the network. Packet types for establishing and breaking connections are defined as in TCP.

A TCP-like connection is full-duplex and a sliding window is used to allow multiple outstanding transport packets. An ARQ bit in the transport header is used to require an immediate acknowledgment from the opposite end.

VMTP-like connections are used for transient messages (i.e. terminal-to-terminal mail messages). VMTP-like connection records are built automatically. A VMTP-like connection record is built (or updated) whenever a VMTP-like transport message is received. The advantage is that an explicit connection request is not required. The disadvantage is that longer and more carefully selected sequence numbers are required. A VMTP-like connection is half-duplex. (A full-duplex connection at a higher layer can be built with two independent half-duplex VMTP-like connections.) Acknowledgments must be handled by higher layers.

Transport connections are defined by the network end-to-end destination and source addresses.

A MAX_TP_LIFE timeout is associated with transport connections. Transport connection records are purged after a MAX_TP_LIFE time expires without activity on the connection. The transport entity in a terminal can ensure that its transport connection will not be lost by transmitting an empty time-fill transport packet whenever TP_TIMEOUT time expires without activity.

The transport entity in a node stores messages for possible retransmission. Note that retransmissions may not always follow the same path (primarily) due to moving terminals and the resulting changes in the spanning tree. For example, the network entity in a parent node may disconnect a child after the DLC entity reports a message delivery failure. The child will soon discover that it is detached and will reattach to the spanning tree. Now when the transport entity (i.e. in the root) re-sends the message, it will follow the new path.
Transport Message Timing and Sleeping Terminals.

The transport entity in a terminal calculates a separate timeout for SEND and TRANSACTION operations. Initially, both timeouts are a function of the distance of the terminal from the root node.

A TCP-like algorithm is used to estimate the expected propagation delay for each message type. Messages, which require a response, are retransmitted if twice the expected propagation time expires before a response is received. SLEEPING terminals can power down for a large percentage of the expected propagation delay before waking up to receive the response message. Note that missed messages may be stored by the network layer for "count" hello times.
Medium Access Control (MAC) Theory and Implementation Notes.

Access to the network communications channel is regulated in several ways: executing the full CSMA algorithm (see MAC layer above). The sender retransmits unacknowledged messages until a RETRY_MAX count is exhausted.

The retry time of the DLC must be relatively short so that lost nodes can be detected quickly. When the DLC layer reports a failure to deliver a message to the network layer, the network layer can 1) save messages for SLEEPING terminals for later attempts, or 2) DETACH the node from the spanning tree. Note that most lost nodes are due to moving terminals.

The node identifier part of the DLC address is initially all 0's for all nodes except the root node. The all 0's address is used by a node to send and received data-link frames until a unique node identifier is passed to the DLC entity in the node. (The unique node identifier is obtained by the network entity.)
Address Resolution.

Well-known names too are bound to network addresses in several ways:

The network address and TRANSPORT ACCESS ID of a name server, contained in the root, is well-known by all nodes.

A node can register a well-known name with the name server contained in the root node.

A node can request the network access address of another application from the name server by using the well-known name of the application.

Possible Extensions.

Base station-to-base station traffic could also be routed through the controller if the backward learning algorithm included base station nodes. (Each base station would simply have to remember which direction on its branch of the spanning tree to send data directed toward another base station.)

The possibility of multiple controllers is kept open by including a spanning-tree identifier in address fields. Each controller defines a unique spanning tree. A node can be in more than one spanning tree, with separate network state variables defined for each.

Thus, the preferred embodiment of the present invention describes an apparatus and a method of efficiently routing data through a network of intermediate base stations in a radio data communication system.

In alternate embodiments of the present invention, the RF Networks contain multiple gateways. By including a system identifier in the address field of the nodes, it is possible to determine which nodes are connected to which networks.
Multipath Fading.

In a preferred embodiment, the data to be sent through the RF communication link is segmented into a plurality of DATA packets and is then transmitted. Upon receipt, the DATA packets are reassembled for use or storage. Data segmentation of the RF link provides better communication channel efficiency by reducing the amount of data loss in the network. For example, because collisions between transmissions on an RF link cannot be completely avoided, sending the data in small segments results in an overall decrease in data loss in the network, i.e., only the small segments which collide have to be re-sent.

Similarly, choosing smaller data packets for transmission also reduces the amount of data loss by reducing the inherent effects of perturbations and fluctuations found in RF communication links. In particular, RF signals are inherently subject to what is termed "multi-path fading." A signal received by a receiver is a composite of all signals that have reached that receiver by taking all available paths from the transmitter. The received signal is therefore often referred to as a "composite signal" which has a power envelope equal to the vector sum of the individual components of the multi-path signals received. If the signals making up the composite signal are of amplitudes that add "out of phase", the desired data signal decreases in amplitude. If the signal amplitudes are approximately equal, an effective null (no detectable signal at the receiver) results. This condition is termed "fading".

Normally changes in the propagation environment occur relatively slowly, i.e., over periods of time ranging from several tenths ($\frac{1}{10}$'s) of seconds to several seconds. However, in a mobile RF environment, receivers (or the corresponding transmitters) often travel over some distance in the course of receiving a message. Because the signal energy at each receiver is determined by the paths that the signal components take to reach that receiver, the relative motion between the receiver and the transmitter causes the receiver to experience rapid fluctuations in signal energy. Such rapid fluctuations can cause fading and result in the loss of data if the amplitude of the received signal falls below the sensitivity of the receiver.

Over small distances, the signal components that determine the composite signal are well correlated, i.e., there is a small probability that a significant change in the signal power envelope will occur over the distance. If a transmission of a data packet can be initiated and completed before the relative movement between the receiver and transmitter exceeds the "small distance", data loss to fading is unlikely to occur. The maximum "small distance" wherein a high degree of correlation exists is referred to hereafter as the "correlation distance".

As expressed in wavelengths of the carrier frequency, the correlation distance is one half (½) of the wavelength, while a more conservative value is one quarter (¼) of the wavelength. Taking this correlation distance into consideration, the size of the data packet for segmentation purposes can be calculated. For example, at 915 MHz (a preferred RF transmission frequency), a quarter wavelength is about 8.2 centimeters. A mobile radio moving at ten (10) miles per hour, or 447 centimeters per second, travels the quarter wavelength in about 18.3 milliseconds. In such an environment, as long as the segment packet size remains under 18.3 milliseconds, fading does not pose any problems. In a preferred embodiment, five (5) millisecond data packet segments are chosen which provides a quasi-static multipath communication environment.

Duty Cycle.

In a preferred embodiment, each base station broadcasts HELLO messages about every two (2) seconds. If upon power up, two base stations choose to broadcast at the exact same broadcast, collisions between HELLO messages would occur and continue to occur in a lock-step fashion upon each broadcast. To prevent such an occurrence, each base station chooses a pseudo-random offset from the 2 second base time between HELLO messages to actually broadcast the HELLO message. For example, instead of beginning each HELLO message broadcast at exactly 2 seconds after the last, the base station might pseudo-randomly offset the 2 seconds by a negative (−) value of 0.2, yielding a broadcast at 1.8 seconds. Because every base station generates a different pseudo-random offset generation, the problem of lock-stepping collisions is avoided.

Additionally, instead of using a true randomization, a pseudo-random offset is used which bases all pseudo-random offset calculations on a seed value (the "seed"). The "seed" is broadcast in each HELLO message so that the timing of the next HELLO message may be calculated by any listening mobile terminal. The use of the seed, and pseudo random offset generation, allows the terminal to "sleep" (enter an energy and CPU saving mode) between HELLO messages and be able to "wake up" (dedicate energy and CPU concentration on RF reception) and stay awake for the minimal time needed to receive the next HELLO message. The relationship between the time that a base station must remain awake to the time it may sleep is called the "duty cycle".

Using a 2 second HELLO to HELLO message timing with a pseudo-random offset range of +/−⅓ of a second, the preferred embodiment has achieved a very low duty cycle. Further details of this timing can be found in the Bridge Layer Specification in Appendix E.

In addition, Appendix A provides a list of the program modules which are found in microfiche Appendix B. These modules comprise an exemplary computer program listing of the source code ("C" programming language) used by the network controllers and intelligent base transceivers of the present invention. Note that the term "AMX" found in Appendices A and B refers to the operating system software used. "AMX" is a multi-tasking operating system from KADAK Products, Ltd., Vancouver, B.C., Canada. Appendix C, D, E, F, and G provide system specifications for the SST Network Architecture, SST Network Frame Format, Bridging Layer, MAC Layer, and Physical Layer of one embodiment of the present invention.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

What is claimed is:

1. A multi-hop data communication network having RF capability comprising:

a plurality of terminal nodes; and a plurality of bridging nodes which dynamically create and revise communication pathways between any two nodes in the network, each of the bridging nodes independently storing and maintaining local information that specifies how communication traffic should flow through that bridging node, and the plurality of bridging nodes, together, providing a complete specification for the communication pathways in the multi-hop communication network; and said nodes using HELLO messages with a backward learning technique independently create and maintain locally stored information to specify how communication traffic should flow through that bridging node.

2. The multi-hop data communication system of claim 1 further comprising means for offsetting the time period between HELLO message broadcasts.

3. The multi-hop data communication system of claim 2 further comprising means for calculating the time period between HELLO message broadcasts to be received.

4. The multi-hop data communication system of claim 3 wherein said means for offsetting further comprising a first pseudo-random number generator for generating an offset.

5. The multi-hop data communication system of claim 4 wherein said means for calculating further comprising a second pseudo-random number generator used for computing the offset.

6. The multi-hop data communication system of claim 5 further comprising means for passing a seed value between said means for offsetting and said means for calculating so as to synchronize said first and second pseudo-random number generators.

7. A multi-hop data communication system having RF capability comprising:

a plurality of terminal nodes;

a plurality of bridging nodes; and said bridging nodes further comprising, means for maintaining communication pathways between any two nodes in the network by repeatedly broadcasting messages identifying itself, means for determining the timing between the identifying message broadcasts.

8. The multi-hop data communication system of claim 7 wherein said terminal nodes further comprising means for calculating the time period between HELLO message broadcasts to be received.

9. The multi-hop data communication system of claim 8 wherein the means for determining the timing and the means for calculating the time both further comprise pseudo-random number generator using a common seed value.

10. The multi-hop data communication system of claim 9 further comprising means for passing a seed value between said means for determining the timing and the means for calculating the time.

11. In a multi-hop data communication network having a plurality of bridging nodes and RF communication capability, a plurality of terminal nodes comprising:

a RF transceiver;

means for segmenting digitally encoded data to be transferred into discrete data packets;

means responsive to said segmenting means for individually transmitting each discrete data packet; and means for reconstructing discrete data packets into digitally encoded data.

12. The multi-hop data communication network of claim 11 wherein said terminal nodes further comprise means for digitally encoding voice signals, and means for generating audio signals from digitally encoded voice signals.

13. The multi-hop data communication network of claim 11 wherein the length of said discrete data packets are chosen based on correlation distance.

14. The multi-hop data communication network of claim 12 wherein the length of said discrete data packets are chosen based on correlation distance.

15. A communication network comprising:

a plurality of terminal nodes;

a plurality of bridging nodes which, together, form a spanning tree that specifies wireless communication pathways for relaying messages between said plurality of terminal nodes;

one of said plurality of terminal nodes selectively enters or exits a sleep mode through direct, wireless communication with one of said plurality of bridging nodes;

the one of said plurality of bridging nodes attempts to forward messages to the one of said plurality of terminal nodes when the one of said plurality of terminal nodes is not in the sleep mode;

the one of said plurality of bridging nodes stores messages destined for the one of said plurality of terminal nodes when the one of said plurality of terminal nodes is in the sleep mode; and the one of said plurality of bridging nodes forwards stored messages to the one of said plurality of terminal nodes operating in the sleep mode upon request from the one of said plurality of terminal nodes.

16. The communication network of claim 15 further comprising means within the one of said plurality of bridging nodes for determining whether the one of said plurality of terminal nodes has been disconnected from the network.

17. The communication network of claim 16 wherein the determining means considers whether the one of said plurality of terminal nodes is in the sleep mode in making a determination of disconnection.

18. The communication network of claim 15 wherein the one of said plurality of terminal nodes comprises a receiver, and the one of said plurality of terminal nodes, when in the sleep mode, enters a power saving state that disables the receiver.

19. The communication network of claim 18 wherein the power saving state is entered for a period of time after which the one of said plurality of terminal nodes reactivates the receiver to receive communication from the one of said plurality of bridging nodes.

20. The communication network of claim 19 wherein the period of time is of such length as to permit the one of said plurality of terminal nodes to maintain time synchronization with communications from the one of said plurality of bridging nodes.

21. A wireless communication network comprising:

a plurality of terminal nodes;

a plurality of bridging nodes which, together, form a spanning tree that specifies wireless communication pathways for forwarding messages between said plurality of terminal nodes;

each of said plurality of terminals selectively enters or exits a sleep mode through communication with at least one of said plurality of bridging nodes; and said plurality of bridging nodes forward messages to those of said plurality of terminal nodes that are in the sleep mode only upon request, and immediately attempt to forward messages to those of said plurality of terminal nodes that are not in the sleep mode.

22. The communication network of claim 21 further comprising means within said plurality of bridging nodes for determining whether any of said plurality of terminal nodes has been disconnected from the network.

23. The communication network of claim 22 wherein the determining means considers whether said plurality of terminal nodes are in the sleep mode in making a determination of disconnection.

24. The communication network of claim 21 wherein each of said plurality of terminal nodes comprises a receiver, and each of said plurality of terminal nodes, when in the sleep mode, enters a power saving state that disables the receiver.

25. The communication network of claim 24 wherein the power saving state is entered for a period of time after which each of said plurality of terminal nodes reactivates the receiver to receive communications from said plurality of bridging nodes.

26. The communication network of claim 25 wherein the period of time is of such length as to permit said plurality of terminal nodes to maintain time synchronization with communications from said plurality of bridging nodes.

27. A communication network supporting wireless communication throughout an area comprising:

a plurality of roaming terminal nodes;

a plurality of bridging nodes which, together, form wireless communication pathways for relaying messages between said roaming terminal nodes;

each of the plurality of bridging nodes transmits at predetermined intervals hello messages that indicated the presence of pending messages; and each of the plurality of roaming terminal nodes comprising a controller and a wireless receiver, wherein the controller synchronizes use of the wireless receiver at the predetermined intervals to receive the hello messages transmissions.

28. The communication network of claim 27 wherein the plurality of roaming terminal nodes operate under limited battery power in a low power consumption state by disabling the wireless receiver; and each of the plurality of roaming terminal nodes enables the wireless receiver at the predetermined intervals to receive hello message transmissions.

29. The communication network of claim 28 wherein the plurality of roaming terminal nodes leave the lower power consumption state to receive pending messages.

* * * * *